Oct. 17, 1939.  B. HAMBLET  2,176,400
COOKING UTENSIL
Filed July 23, 1938
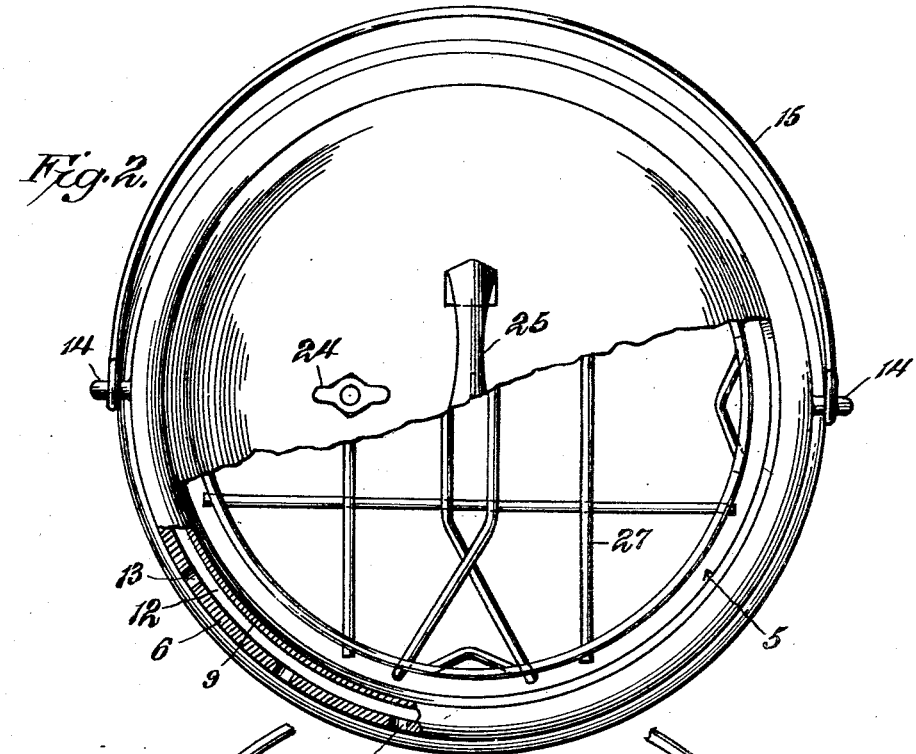
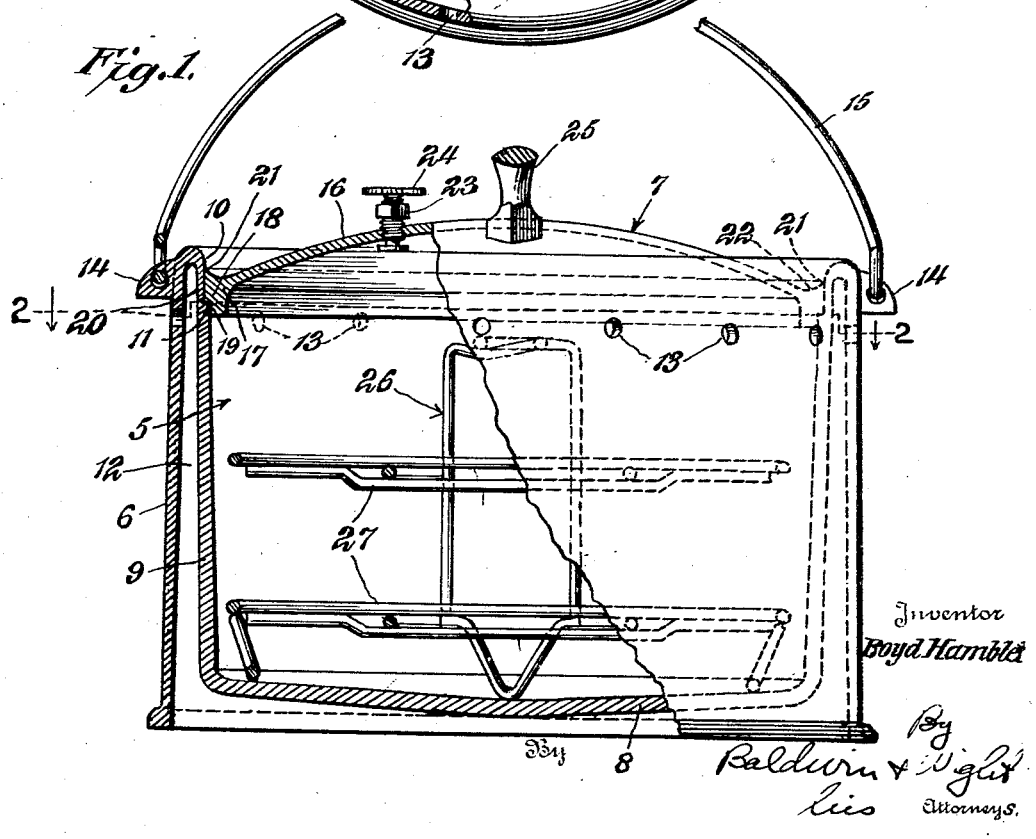
Inventor
Boyd Hamblet
By
Baldwin & Wight
his Attorneys.

Patented Oct. 17, 1939

2,176,400

UNITED STATES PATENT OFFICE 2,176,400

COOKING UTENSIL

Boyd Hamblet, Taft, Calif.

Application July 23, 1938, Serial No. 220,973

6 Claims. (Cl. 53—1)

This invention relates to new and useful improvements in cooking utensils generally, although more particularly to those which are provided with skirts spaced outwardly from the walls of the food-receiving receptacle.

The principal object of the invention is to provide a cooking utensil having a skirt spaced outwardly from the walls of the food-receiving receptacle, the lower edge of the skirt being disposed below the bottom of the receptacle whereby the bottom of the receptacle will be disposed above the lower edge and the support upon which the receptacle rests.

Another object of the invention is to provide a device of the above stated character which can be used for either ordinary cooking or for baking.

Another object of the invention is to provide a device of the character referred to which will not be affected by air currents, particularly over a fire or a camp stove in the open.

Another object of the invention is to provide a device of the character stated which will effect a saving in fuel and time consumption during cooking operations.

Another object of the invention is to provide such a device which is simple in construction and economical to manufacture.

With these and other objects in view, the invention will be understood from a reading of the following description, the appended claims, and the accompanying drawing.

In the drawing:

Figure 1 is a front elevation, partly in section, of a cooking utensil constructed in accordance with my invention; and Figure 2 is a top plan view thereof, partly in section, on the line 2—2 of Figure 1.

Referring to the drawing in detail, my invention is embodied in a cooking utensil having a food-receiving receptacle or cooking chamber 5, a skirt 6, and a lid 7, all of which preferably are formed of metal.

The receptacle includes a bottom 8, a substantially cylindrical wall 9, and an open top. The bottom of the receptacle is of uniform thickness and is of an inverted slightly coniform shape to facilitate the flow of heat outwardly. The wall 9, as seen in section, is of uniformly decreasing thickness from the bottom to the top. This gradual decrease in thickness facilitates the maintenance of a substantially uniform temperature throughout the wall of the receptacle. The upper end of the receptacle is counterbored as at 10 to provide a resultant lid-engaging ledge or shoulder 11.

The skirt 6 is integral with the upper edge of the receptacle and extends downwardly therefrom to a plane below the plane of the bottom, thereby providing a space 12 between the outer surface of the receptacle wall and the inner surface of the skirt for the passage of hot air.

By having the lower edge of the skirt extend below the plane of the bottom, the utensil as a whole will be supported on the lower edge of the skirt and the bottom will be spaced thereabove. It will therefore be readily seen that the flow of heat from the source of heat over which the utensil is placed will be almost entirely confined within the limits of the skirt, thereby effecting a material conservation of heat. Also, since the lower edge of the skirt is disposed below the plane of the bottom, the cooling effect of atmospheric air currents will be greatly curtailed. It is to be noted that the uniformly decreasing thickness of the wall 9 is continuous in the skirt. That is, the wall 9 tapers uniformly from bottom to top, and the skirt, formed integrally with the wall 9, has a corresponding taper from top to bottom.

The skirt is provided with a plurality of vents 13 disposed in a plane slightly below the plane of the ledge 11 for maintaining a flow of heated air around the receptacle, but at the same time restricting the flow to prevent an undue loss of heat. Diametrically opposite ears 14, 14 are formed integral with the skirt and are located adjacent the upper edge thereof for receiving a bail 15.

It is to be noted that the extreme upper portion of the space 12 is disposed above the plane of the vents, thereby providing a dead air space adjacent the upper edge of the receptacle which will therefore be maintained at a lower temperature than the portions below the plane of the vents.

The lid 7 includes an upwardly bowed body portion 16 extending outwardly to a thickened annulus 17. The annulus is shaped to provide a seating portion 18 engageable with the ledge 11, a downwardly extending flange 19 engageable with the inner surface of the receptacle, and an upwardly extending flange 20 of relatively great depth engageable with the inner surface of the counterbore 10, which terminates in a feather edge 21. The shaping of the flange 20 to a feather edge results in the formation of an upwardly turned edge portion 22 of the body portion 16. This upwardly turned portion 22 serves to prevent any debris which may have accumulated on the lid from falling into the receptacle when the lid is removed.

A manually operable moisture and pressure release valve 23 having a finger knob 24 is secured on the lid and is used to release moisture from the receptacle when used for baking. When the utensil is used for ordinary cooking the valve is kept closed.

The lid is also provided with the usual handle 25.

When the utensil is used for baking purposes a wire rack 26 having one or more shelves 27 is inserted in the receptacle and supports the food to be baked in spaced relation to the bottom.

Thus, it will be seen that I have provided a skirted cooking utensil which will conserve heat, which can be used either for ordinary cooking or for baking, and which is of simple construction.

It is of course to be understood that the details of structure and arrangement of parts may be variously changed and modified without departing from the spirit and scope of my invention.

I claim:

1. A cooking utensil including wall and bottom portions defining an inner cooking chamber, a skirt spaced from said wall portions and extending downwardly from the upper edge thereof, the upper end of said wall portions being counterbored to form a resultant lid-engaging ledge, and a relatively low lid mounted in said counterbore marginally spaced below the plane of said upper edge and engaging said ledge by surface contact to form a substantially moisture-tight closure.

2. A cooking utensil including wall and bottom portions defining an inner cooking chamber, a lid for said chamber, a skirt spaced from said wall portions and extending downwardly from the upper edge thereof, said wall portions having a uniformly decreasing thickness from the bottom to said lid to provide a substantially uniform temperature gradient therethrough when in use, the upper end of said wall portions being counterbored to form a resultant lid-engaging ledge, and said lid being mounted in said counterbore and engaging said ledge by surface contact to form a substantially moisture-tight closure.

3. A cooking utensil including wall and bottom portions defining an inner cooking chamber, a skirt spaced from said wall portions and extending downwardly from the upper edge thereof, said skirt being provided with a plurality of vents disposed near the upper edge thereof, the lower edge of said skirt being disposed below the bottom portion whereby said bottom portion is spaced above the support plane of said skirt, the upper end of said wall portions being counterbored to form a resultant lid-engaging ledge, and a relatively low lid mounted in said counterbore marginally below the upper extremity of the space between the skirt and wall portions and engaging said ledge by surface contact to form a substantially moisture-tight closure.

4. A cooking utensil including wall and bottom portions defining an inner cooking chamber, a skirt spaced from said wall portion and extending downwardly from the upper edge thereof, said wall portion at the top being reduced on the interior thereof to provide a ledge at an elevation below the upper extremity of the space between said wall portion and skirt, a lid having its marginal portion below the upper extremity of the said wall portion resting on said ledge and peripherally fitting the reduced portion, said wall portion having a uniformly decreasing thickness from the bottom to said lid.

5. A cooking utensil including wall and bottom portions defining an inner cooking chamber, a skirt spaced from said well portion and extending downwardly from the upper edge thereof, said wall portion at the top being reduced on the interior thereof to provide a ledge at an elevation below the upper extremity of the space between said wall portion and skirt, said skirt having openings therethrough adjacent the plane of said ledge, a lid having its marginal portion below the upper extremity of the said wall portion resting on said ledge and peripherally fitting the reduced portion, pressure release valve means carried by said lid, said wall portion having a uniformly decreasing thickness from the bottom to said lid.

6. A cooking utensil including wall and bottom portions defining an inner cooking chamber, a skirt spaced from said wall portion and extending downwardly from the upper edge thereof, said wall portion at the top being reduced on the interior thereof to provide a ledge at an elevation below the upper extremity of the space between said wall portion and skirt, a lid having its marginal portion below the upper extremity of the said wall portion resting on said ledge, said marginal portion of the lid being thickened and having its upper surface extending outwardly and upwardly to a feather-edge fitting the reduced portion so as to prevent the falling of debris into the cooking chamber when the lid is removed.

BOYD HAMBLET.